United States Patent [19]

Das et al.

[11] Patent Number: 4,600,755

[45] Date of Patent: Jul. 15, 1986

[54] FREE RADICAL INITIATED POLYMERIZATION OF POLYMERIZABLE ETHYLENICALLY UNSATURATED MONOMER COMPONENT IN THE PRESENCE OF HYDROGEN PEROXIDE

[75] Inventors: Suryya K. Das, Pittsburgh; Rostyslaw Dowbenko, Gibsonia, both of Pa.

[73] Assignee: PPG Industries, Inc., Pittsburgh, Pa.

[21] Appl. No.: 719,661

[22] Filed: Apr. 3, 1985

[51] Int. Cl.$^4$ ................................................ C08F 4/30
[52] U.S. Cl. ...................................... 526/81; 526/229
[58] Field of Search .................................. 526/81, 229

[56] References Cited

U.S. PATENT DOCUMENTS 3,366,605 1/1968 Seiner .................................... 525/384
3,370,050 2/1968 Seiner .................................... 526/229

FOREIGN PATENT DOCUMENTS 76045 5/1982 Japan .
69206 4/1983 Japan .

*Primary Examiner*—Paul R. Michl
*Attorney, Agent, or Firm*—William J. Uhl

[57] ABSTRACT

A method of preparing a free radical initiated addition polymer in the presence of hydrogen peroxide solution is disclosed. The hydrogen peroxide solution is added incrementally to the reaction mixture during the course of the polymerization with water and low boiling organic solvents being continuously removed from the reaction mixture. The invention enables the polymerization to occur at high temperatures which is conducive to the preparation of low molecular weight polymers.

16 Claims, No Drawings

FREE RADICAL INITIATED POLYMERIZATION OF POLYMERIZABLE ETHYLENICALLY UNSATURATED MONOMER COMPONENT IN THE PRESENCE OF HYDROGEN PEROXIDE

BACKGROUND OF THE INVENTION

1. Field of the Invention

The present invention relates to free radical initiated polymerization of polymerizable ethylenically unsaturated monomers, and more particularly, to polymerization in the presence of hydrogen peroxide

2. Brief Description of the Prior Art

Free radical initiated polymerization of polymerizable ethylenically unsaturated monomers in organic medium is usually accomplished with a so-called oil-soluble free radical initiator such as an organic peroxide or an azo compound which is soluble in the organic medium. Hydrogen peroxide is a well-known free radical initiator for addition polymerizations of ethylenically unsaturated monomers. However, its use is primarily for polymerization in aqueous emulsion polymerization techniques and it is not as well known for use in non-aqueous polymerization which, as mentioned above, uses oil-soluble free radical initiators. However, these materials are relatively expensive and in the case of certain of the azo compounds will not be available because of health and safety problems.

The use of aqueous hydrogen peroxide as a free radical initiator in non-aqueous polymerization is, however, known in the art. U.S. Pat. Nos. 3,370,050 and 3,366,605 disclose the use of aqueous hydrogen peroxide as a free radical initiator in addition polymerization to form interpolymers of hydroxyalkyl esters of unsaturated acids and to form interpolymers of ethylenically unsaturated amides. In accordance with these patents, the aqueous hydrogen peroxide is added along with the polymerizable monomers to a reaction zone and the reaction mixture is heated to reflux to conduct the polymerization. The water added with the peroxide is removed during the latter stages or after polymerization has been completed. Although using aqueous hydrogen peroxide in this fashion is reported as being effective in preparing the interpolymers described in U.S. Pat. Nos. 3,366,605 and 3,370,050, these interpolymers are of relatively high molecular weight, and it has been found that using aqueous hydrogen peroxide in this fashion is not particularly effective in preparing low molecular weight acrylic polymers having a molecular weight of 4000 or less. These polymers are becoming of increasing interest in the coatings industry where, because of their low molecular weight and resultantly low viscosities, they can be formulated into coating compositions with little organic solvent thereby complying with environmental regulations dealing with solvent contents in coating compositions. It has been found that conducting the reaction at reflux in the presence of water limits the temperature of reaction that is achievable, and high reaction temperatures have been found to be preferred for preparing low molecular weight polymers. Also, the presence of an aqueous free radical initiator in the reaction medium results in heterophase polymerization, that is, polymerization in both water and organic phases which results in the preparation of a polymer with a relatively broad molecular weight distribution leading to undesirably high viscosities.

SUMMARY OF THE INVENTION

In accordance with the present invention, a method of preparing free radical initiated addition polymers by polymerizing a polymerizable ethylenically unsaturated monomer component in the presence of a solution of hydrogen peroxide is provided. The hydrogen peroxide solution is added to the polymerizing monomer component incrementally throughout the course of the polymerization and low boiling organic solvents and water are simultaneously removed from the polymerizing monomer component as the hydrogen peroxide solution is being added.

The process of the invention enables one to achieve relatively high reaction temperatures through the use of high boiling solvents and also avoids heterophase polymerization conditions. The process of the present invention results in a low molecular weight acrylic polymer with a relatively narrow molecular weight distribution. Also, the use of hydrogen peroxide insures that many of the polymeric molecules will have hydroxyl groups associated with them. Many times, in preparing low molecular weight acrylic monomers even with a relatively high percentage of hydroxyl-containing acrylic monomer, some molecules in the distribution of polymer molecules obtained, will contain insufficient or even no hydroxyl groups. This results in deficiencies in curing when the polymers are subsequently cured with curing agents such as aminoplasts or blocked isocyanates leading to defects and deficiencies in the cured films.

Other Prior Art

Besides the prior art mentioned above, Japanese Kokai No. 76045/1982 discloses the use of aqueous hydrogen peroxide in the preparation of relatively low molecular weight (i.e., 500–5000 on a number average basis) acrylic polymers which are prepared in organic solvent. To achieve high temperatures of polymerization, the reaction is conducted under high pressure in an autoclave. This process is more dangerous and less economical than the process of the present invention which does not require the use of high pressure and the attending expensive high pressure equipment.

Japanese Kokai No. 69206/1983 also discloses the use of aqueous hydrogen peroxide in preparing acrylic polymers in organic solution. In this procedure, the aqueous hydrogen peroxide is first dissolved in an acetic acid ester such as butyl acetate and water is removed from the solution by azeotropic distillation. The organic solution of the hydrogen peroxide is then used in the polymerization. In comparison to the present invention, the process described in Japanese Kokai No. 69206/1983 is limited in its choice of organic solvent and requires a cumbersome pretreatment of the aqueous hydrogen peroxide (i.e., dissolution and distillation) before use. Also, the solubility of aqueous hydrogen peroxide in acetic acid esters is limited. The process of the present invention, on the other hand, enables the direct use of the hydrogen peroxide and is not limited by its solubility in organic solvents.

DETAILED DESCRIPTION

The process of the present invention involves the addition polymerization of polymerizable ethylenically unsaturated monomers which polymerize through their ethylenically unsaturated groups and in which the polymerization is initiated by free radicals. The ethylenically unsaturated monomer component comprises one or, as is more usual, a mixture of ethylenically unsaturated monomers. Examples of suitable monomers are olefinic hydrocarbons, particularly monomers having the structure $CH_2=C=$ and include vinylidene monomers, vinyl monomers and acryl including methacryl monomers. Examples of suitable monomers include ethylene, propylene, 1,3-butadiene, styrene and vinyl toluene; halogenated monolefinic hydrocarbons such as chlorostyrene; unsaturated esters of organic acids such as vinyl acetate and vinyl butyrate; esters of unsaturated acids such as methyl methacrylate, ethyl acrylate, butyl methacrylate, 2-ethylhexyl acrylate and dimethyl maleate; unsaturated acids such as acrylic acid, methacrylic acid and maleic acid; unsaturated hydroxyl-containing compounds such as hydroxyethyl methacrylate, hydroxypropyl methacrylate, allyl alcohol and bis(hydroxyethyl)maleate; unsaturated epoxy group-containing compounds such as glycidyl methacrylate; unsaturated amide group-containing monomers such as acrylamide, methacrylamide and alkoxy-substituted amides such as N-butoxymethylacrylamide and N-ethoxymethylmethacrylamide; and nitriles such as acrylonitrile and methacrylonitrile.

For use as a thermosetting resinous binder in coating compositions, the resultant polymer should contain active hydrogens so as to be reactive with curing agents such as an aminoplast or a polyisocyanate. For reaction with an aminoplast, the active hydrogens are usually hydroxyl and/or carboxylic acid; for reaction with a polyisocyanate, the active hydrogens are usually hydroxyl and/or amine. Although the use of the hydrogen peroxide free radical initiator will introduce hydroxyl groups into the terminal position of the polymer molecule, it is preferred that the monomer component comprise at least 1 to 50 percent by weight based on total weight of monomers of compatible active hydrogen-containing unsaturated monomer.

Preferably, the ethylenically unsaturated monomers are polymerized in an organic diluent in which the monomers are soluble and which has a high boiling point, that is, a boiling point of at least 125° C., preferably at least 140° C., and usually 140° to 200° C. at atmospheric pressure. Examples of suitable solvents include ketones such as methyl amyl ketone, methyl isobutyl ketone and esters such as isobutyl isobutyrate, 2-ethylhexyl acetate and commercially available high boiling ester mixtures such as those available from Exxon Company as EXTATE solvents; hydrocarbons such as cumene, xylene, butyl benzene and commercially available hydrocarbon mixtures such as those available from Exxon Company as aromatic 100; glycol ethers such as 2-butoxyethanol and the monobutyl ether of diethylene glycol. Also, low molecular weight polymers such as polyesters having a number average molecular weight of less than 3000, usually between 500 and 1000, either alone or in admixture with one of the high boiling organic solvents mentioned above can be used as the organic diluent. Also, relatively low boiling organic solvents, that is, those which have a boiling point below 100° C. such as isopropanol and methyl ethyl ketone can be present with the high boiling organic solvents. The preferred diluents are ketones such as methyl amyl ketone because they result in the lower molecular weight products compared to other diluents. The amount of organic diluent which is used in the practice of the invention is not particularly critical and is usually about 20 to 50 percent by weight of the reaction medium based on total weight of monomer charge and organic diluent. Although not preferred, the polymerization can be bulk polymerization.

The hydrogen peroxide solution which is used in the practice of the invention is preferably an aqueous solution which comes as a commercially available material. High concentrated solutions, that is, 70 to 90 percent by weight, can be used but are more difficult to handle than solutions of lower concentration, that is, about 20 to 50 percent by weight. Such lower concentrations can be employed and are preferred in large scale reactors. Organic solutions of hydrogen peroxide, such as those in low boiling organic solvents such as ethyl acetate can be used, but their use is not preferred.

The amount of hydrogen peroxide which is used can be as low as 0.1 percent by weight but preferably is about 2 to 20 percent by weight, the percentage by weight as hydrogen peroxide and being based on total weight of polymerizable ethylenically unsaturated monomers. Higher percentages of hydrogen peroxide are preferred, i.e., 5-20 percent by weight, because they result in lower molecular weight polymers.

In the preferred manner of conducting the polymerization, organic solvent and optionally a portion of the monomer component and hydrogen peroxide solution is heated to reflux. The remaining portion of monomer component and the hydrogen peroxide solution are added slowly to the reaction medium while simultaneously and continuously removing water and low boiling organic solvent from the reaction zone such as by distillation. In other words, the hydrogen peroxide is added to the polymerizing monomer component incrementally during the course of the polymerization and water and low boiling organic solvent are removed as the hydrogen peroxide solution is being added. In this manner, the water associated with the hydrogen peroxide (from the decomposition of the hydrogen peroxide and from the aqueous solvent when aqueous hydrogen peroxide is used) is removed almost as soon as it is added to the reaction zone enabling the reaction to occur at high temperatures, that is, at the approximate boiling point of the remaining high boiling organic solvent.

The time of the reaction will be that to essentially completely convert the monomers to polymer and will depend principally on the temperature and the amount of catalyst used. Preferably, temperatures of the polymerization are at least 140° C., usually about 140° to 200° C. At these temperatures, the time of the reaction will usually be from about 4 to 8 hours.

As mentioned above, the process of the present invention is particularly useful in the preparation of low molecular weight polymers, that is, those having a number average molecular weight of no greater than 8000, preferably 4000 or less, usually between about 4000 to 1000, although the process of the invention can be used to prepare higher molecular weight polymers. Also, the molecular weight distribution or polydispersity (weight average molecular weight divided by the number average molecular weight) of the preferred low molecular weight polymers is usually relatively narrow, that is, less than 5 and preferably from about 2.5 to 3.2. The molecular weights are determined by gel permeation chromatography using a polystyrene standard.

Further, even though the polymer has a low molecular weight, because of the hydrogen peroxide, each molecule is believed to have a hydroxyl group associated with it. The polymer can, along with a suitable crosslinker such as an aminoplast or a polyisocyanate, be used as a resinous binder in coating compositions, particularly of the high solids type.

Set forth below are several examples of the invention for preparing low molecular weight acrylic polymers in an organic diluent using aqueous hydrogen peroxide as free radical initiator.

EXAMPLES

The following examples show the use of aqueous hydrogen peroxide as a free radical initiator for the organic solution polymerization of a mixture of polymerizable ethylenically unsaturated monomers. The aqueous hydrogen peroxide is added to the polymerizing monomer mixture incrementally during the course of the polymerization and the water associated with the hydrogen peroxide is removed by azeotropic distillation as it is added keeping the temperature of the polymerization at at least 140° C. The examples show the polymerization of various monomer mixtures in which the amounts and concentrations of the hydrogen peroxide and the organic solvent are varied which have an effect on the molecular weight and the color of the resultant polymer.

EXAMPLE I

In this example, a monomer mixture comprising 40 percent hydroxypropyl acrylate, 20 percent styrene, 19 percent butyl acrylate, 18.5 percent butyl methacrylate, 2 percent acrylic acid and 0.5 percent methyl methacrylate was polymerized in an aromatic solvent in the presence of 50 percent aqueous hydrogen peroxide (50 percent active) which was used in an amount of about 8.8 percent by weight $H_2O_2$ based on total weight of monomer. The reaction was conducted with the following ingredients:

| Ingredients | Parts by Weight (grams) |
|---|---|
| Kettle Charge | |
| A-100[1] | 1200.0 |
| Feed A | |
| Hydroxypropyl acrylate | 720.0 |
| Styrene | 360.0 |
| Butyl acrylate | 342.0 |
| Butyl methacrylate | 333.0 |
| Acrylic acid | 36.0 |
| Methyl methacrylate | 9.0 |
| Feed B | |
| 50% by weight aqueous hydrogen peroxide | 316.8 |

[1] Aromatic blend of solvents having a boiling point of 160° C., available from Exxon Company as aromatic 100.

The kettle charge was added to a 5-liter reaction flask equipped with two dropping funnels, a thermometer, a condenser and a Dean-Stark trap and heated to reflux. Feeds A and B were added simultaneously over a 5-hour period while maintaining the reaction temperature between 153°–158° C., while continuously removing water by azeotropic distillation. At the completion of the addition of Feeds A and B, the reaction mixture was held at 158° C. for 30 minutes to complete the reaction. The final reaction product had a solids content (measured at 110° C. for 2 hours) of 60 percent, a Gardner-Holdt viscosity of X, an acid value of 9.4, and a color value (Gardner color value) of 1. The polymer had a peak molecular weight ($M_z$) of 3682, a number average molecular weight ($M_n$) of 3682 and a polydispersity of 4.2 as determined by gel permeation chromatography using a polystyrene standard.

EXAMPLE II

A polymer similar to that of Example I was prepared but in which isobutyl isobutyrate was used as a solvent instead of the aromatic 100. The reaction was conducted with the following ingredients:

| Ingredients | Parts by Weight (grams) |
|---|---|
| Kettle Charge | |
| Isobutyl isobutyrate | 1200 |
| Feed A | |
| Hydroxypropyl acrylate | 720 |
| Styrene | 360 |
| Butyl acrylate | 342 |
| Butyl methacrylate | 333 |
| Acrylic acid | 36 |
| Methyl methacrylate | 9 |
| Feed B | |
| 50% by weight aqueous hydrogen peroxide | 316.8 (8.8% $H_2O_2$) |

The kettle charge was added to a 5-liter reaction flask equipped as described in Example I and heated to reflux at 150° C. Feeds A and B were added simultaneously and continuously over a 5-hour period while maintaining the reaction temperature at about 145° C. while continuously removing water by azeotropic distillation. At the completion of the addition of Feeds A and B, the reaction mixture was held for one hour at 146° C. to complete the reaction. The final reaction product had a solids content of 59.8 percent, a Gardner-Holdt viscosity of V, an acid value of 18.9 and a color value of 1. The resultant polymer had a $M_z$ of 8111, a $M_n$ of 3431 and a polydispersity of 3.3 as determined by gel permeation chromatography using a polystyrene standard.

EXAMPLE III

A reaction similar to that of Examples I and II was prepared but in which the organic solvent was methyl amyl ketone. The reaction was conducted with the following ingredients:

| Ingredients | Parts by Weight (grams) |
|---|---|
| Kettle Charge | |
| Methyl amyl ketone | 1200 |
| Feed A | |
| Hydroxypropyl acrylate | 720 |
| Styrene | 360 |
| Butyl acrylate | 342 |
| Butyl methacrylate | 333 |
| Acrylic acid | 36 |
| Methyl methacrylate | 9 |
| Feed B | |
| 50% by weight aqueous hydrogen peroxide | 316.8 (8.8% $H_2O_2$) |

The kettle charge and 10 percent by weight of Feed B were added to a 5-liter reaction flask and the reaction mixture heated to reflux at 130° C. Feed A and the remaining portion of Feed B were added simultaneously to the reaction mixture over a 5-hour period while maintaining the temperature of reaction between 142°–147° C. while continuously removing water by azeotropic distillation. At the completion of the addition of Feeds A and B, the reaction mixture was held for 30 minutes at 145°–150° C. The reaction mixture had a solids content of 61.5 percent, a Gardner-Holdt viscosity of E+, an acid value of 26 and a color value of 1. The polymer had a $M_z$ of 2473, a $M_n$ of 1093 and a polydispersity of 2.31 as determined by gel permeation chromatography using a polystyrene standard.

EXAMPLE IV

A reaction similar to Example III was prepared but in which only 4.5 percent by weight hydrogen peroxide based on weight of monomers was used in the polymerization resulting in a higher molecular weight product. The reaction was conducted with the following ingredients:

| Ingredients | Parts by Weight (grams) |
|---|---|
| Kettle Charge | |
| Methyl amyl ketone | 1200 |
| Feed A | |
| Hydroxypropyl acrylate | 720 |
| Styrene | 360 |
| Butyl acrylate | 342 |
| Butyl methacrylate | 333 |
| Acrylic acid | 36 |
| Methyl methacrylate | 9 |
| Feed B | |
| 50% by weight aqueous hydrogen peroxide | 162 (4.5% $H_2O_2$) |

The kettle charge was added to a 5-liter reaction flask equipped as described in Example I and heated to reflux. Feeds A and B were added simultaneously over a period of about 5 hours while maintaining the reaction temperature between 147°–150° C. while continuously removing water by azeotropic distillation. At the completion of the addition of Feeds A and B, the reaction mixture was held at 150°–153° C. for about 90 minutes to complete the reaction. The reaction mixture had a solids content of 64.1 percent, a Gardner-Holdt viscosity of I-J, an acid value of 12.5 and a color value of 1. The resultant polymer had a $M_z$ of 3862, a $M_n$ of 1806 and a polydispersity of 3.01 as determined by gel permeation chromatography using a polystyrene standard.

EXAMPLE V

This example is similar to Example IV with the exception that 70 percent by weight aqueous hydrogen peroxide was used and the concentration of $H_2O_2$ was 3 percent by weight based on weight of monomer. The reaction was conducted with the following ingredients:

| Ingredients | Parts by Weight (grams) |
|---|---|
| Kettle Charge | |
| Methyl amyl ketone | 1200 |
| Feed A | |
| Hydroxypropyl acrylate | 720 |
| Styrene | 360 |
| Butyl acrylate | 342 |
| Butyl methacrylate | 333 |
| Acrylic acid | 36 |
| Methyl methacrylate | 9 |
| Feed B | |
| 70% by weight aqueous hydrogen peroxide | 77.1 (3% $H_2O_2$) |

The kettle charge was added to a 5-liter reaction flask equipped as described in Example I and heated to reflux at 150° C. Feeds A and B were added simultaneously to the reaction mixture over a period of 5 hours while maintaining the reaction temperature between 150°–152° C. while continuously removing water by azeotropic distillation. At the completion of the addition of Feeds A and B, the reaction mixture was held at 155° C. for about 1 hour to complete the reaction. The reaction mixture had a solids content of 63.2 percent, a Gardner-Holdt viscosity of K, an acid value of 11.5 and a color value of 1. The resultant polymer had a $M_z$ of 3862, a $M_n$ of 1943 and a polydispersity of 2.74 as determined by gel permeation chromatography using a polystyrene standard.

EXAMPLE VI

This example is similar to that of Example IV with the exception that only 2.25 percent by weight hydrogen peroxide based on weight of monomers was used resulting in a higher molecular weight product. The reaction was conducted with the following ingredients:

| Ingredients | Parts by Weight (grams) |
|---|---|
| Kettle Charge | |
| Methyl amyl ketone | 1200 |
| Feed A | |
| Hydroxypropyl acrylate | 720 |
| Styrene | 360 |
| Butyl acrylate | 342 |
| Butyl methacrylate | 333 |
| Acrylic acid | 36 |
| Methyl methacrylate | 9 |
| Feed B | |
| 50% by weight aqueous hydrogen peroxide | 81 (2.25% $H_2O_2$) |

The kettle charge was added to a 5-liter reaction flask equipped as described in Example I and heated to reflux at 150° C. Feeds A and B were added simultaneously over a 5-hour period while maintaining the reaction temperature between 147°–155° C. At the completion of the addition of Feeds A and B, the reaction mixture was held for 2 hours at 155° C. to complete the reaction. The reaction mixture had a solids content of 63.0 percent, a Gardner-Holdt viscosity of J, an acid value of 11.6 and a color value of 2. The resultant polymer had a $M_z$ of 4062, a $M_n$ of 1900 and a polydispersity of 2.82 as determined by gel permeation chromatography using a polystyrene standard.

EXAMPLE VII

This example is similar to that of Example VI with the exception that only 1.5 percent by weight hydrogen peroxide based on weight of monomers was used resulting in a higher molecular weight polymer. The reaction was conducted with the following ingredients:

| Ingredients | Parts by Weight (grams) |
|---|---|
| Kettle Charge | |
| Methyl amyl ketone | 1200 |
| Feed A | |
| Hydroxypropyl acrylate | 720.0 |
| Styrene | 360.0 |
| Butyl acrylate | 342.0 |
| Butyl methacrylate | 333.0 |
| Acrylic acid | 36.0 |
| Methyl methacrylate | 9.0 |
| Feed B | |
| 50% by weight aqueous | 81 (1.5% $H_2O_2$) |

-continued

| Ingredients | Parts by Weight (grams) |
|---|---|
| hydrogen peroxide | |

The kettle charge was added to a 5-liter reaction flask equipped as described in Example I and heated to reflux at 150° C. Feeds A and B were added simultaneously to the reaction mixture over a period of about 5 hours while maintaining the reaction temperature between 150°–153° C. while continuously removing water by azeotropic distillation. At the completion of the addition of Feeds A and B, the reaction mixture was maintained at about 153°–154° C. for about 2 hours to complete the reaction. The reaction mixture had a solids content of 62.9 percent, a Gardner-Holdt viscosity of 0, an acid value of 11.3 and a color value of 2. The resultant polymer had a $M_z$ of 7125, a $M_n$ of 2765 and a polydispersity of 3.77 as determined by gel permeation chromatography using a polystyrene standard.

EXAMPLE VIII

A reaction similar to that of Example VII was prepared but in which 35 percent by weight aqueous hydrogen peroxide was used and the concentration of hydrogen peroxide was 0.5 percent by weight based on weight of monomers resulting in a higher molecular weight product. The reaction was conducted with the following ingredients:

| Ingredients | Parts by Weight (grams) |
|---|---|
| Kettle Charge | |
| Methyl amyl ketone | 1200 |
| Feed A | |
| Hydroxypropyl acrylate | 720 |
| Styrene | 360 |
| Butyl acrylate | 342 |
| Butyl methacrylate | 333 |
| Acrylic acid | 36 |
| Methyl methacrylate | 9 |
| Feed B | |
| 35% by weight aqueous hydrogen peroxide | 26 (0.5% $H_2O_2$) |

The kettle charge was added to a 5-liter reaction flask equipped as described in Example I and heated to reflux. Feeds A and B were added simultaneously over a period of about 5 hours while maintaining the reaction temperature between 147°–149° C. while continuously removing water by azeotropic distillation. At the completion of the addition of Feeds A and B, the reaction mixture was heated at about 150° C. for 2 hours to complete the reaction. The reaction mixture had a solid content of 60.8 percent, a Gardner-Holdt viscosity of S, an acid value of 10.6 and a color value of 2. The resultant polymer had a $M_z$ of 11630, a $M_n$ of 4332 and a polydispersity of 3.5 as determined by gel permeation chromatography using a polystyrene standard.

EXAMPLE IX

A reaction similar to that of Example III was prepared but in which the monomer charge comprised 50 percent by weight hydroxyethyl methacrylate and 50 percent by weight 2-ethylhexyl methacrylate. The reaction was prepared from the following ingredients:

| Ingredients | Parts by Weight (grams) |
|---|---|
| Kettle Charge | |
| Methyl amyl ketone | 1200 |
| Feed A | |
| Hydroxyethyl methacrylate | 900 |
| 2-Ethylhexyl methacrylate | 900 |
| Feed B | |
| 50% by weight aqueous hydrogen peroxide | 316.8 (8.8% $H_2O_2$) |

The kettle charge was added to a 5-liter reaction flask equipped as described in Example I and heated to reflux at 150° C. Feeds A and B were added simultaneously over a period of about 5 hours while maintaining the reaction temperature between 150°–157° C. while continuously removing water by azeotropic distillation. At the completion of the addition of Feeds A and B, the reaction mixture was held for 4 hours at about 150°–155° C. The reaction mixture had a solids content of 59 percent, a Gardner-Holdt viscosity of A, an acid value of 12.5, a color value of 2, a $M_z$ of 1016, a $M_n$ of 757 and a polydispersity of 1.73 as determined by gel permeation chromatography using a polystyrene standard.

EXAMPLE X

This example is similar to that of Example V with the exception that the solvent used was a mixture of methyl amyl ketone and a low molecular weight polyester. Also, the monomer charge comprised 35 percent by weight 2-ethylhexyl acrylate, 34.5 percent by weight styrene, 30 percent by weight hydroxyethyl methacrylate and 0.5 percent by weight methyl methacrylate. The concentration of hydrogen peroxide was 0.3 percent by weight based on weight of monomers. The reaction was prepared from the following ingredients:

| Ingredients | Parts by Weight (grams) |
|---|---|
| Kettle Charge | |
| Polyester[1] | 300 |
| Methyl amyl ketone | 300 |
| Feed A | |
| 2-Ethylhexyl acrylate | 315 |
| Styrene | 310.5 |
| Hydroxyethyl methacrylate | 270.0 |
| Methyl methacrylate | 4.5 |
| Feed B | |
| 50% by weight aqueous hydrogen peroxide | 54.0 (0.3% $H_2O_2$) |

[1]Low molecular weight polyester prepared from condensing 300.7 parts by weight 1,6-hexanediol, 183.1 parts by weight hexahydrophthalic anhydride, and 115.8 parts by weight of adipic acid in 62.2 parts by weight methyl isobutyl ketone. The reaction was catalyzed by 0.06 parts by weight butyl stannoic acid and 0.31 parts by weight triphenyl phosphate. The polyester had an acid value of 8.14, a hydroxyl value of 107.4, a solids content of 88.5, and a Gardner-Holdt viscosity of U-V.

The kettle charge was added to a 5-liter reaction flask equipped as described in Example I and heated to reflux at 148° C. Feeds A and B were added simultaneously over the period of about 3 hours while maintaining the reaction temperature between 148°–156° C. while continuously removing water by azeotropic distillation. At the completion of the addition of Feeds A and B, the reaction mixture was held for about 1 hour at 165°–169° C. to complete the reaction. The reaction mixture had a solids content of 79.1 percent, an acid value of 7.4, a Gardner-Holdt viscosity of Z and a color value of 2.

We claim:

1. A method of preparing a free radical initiated addition polymer by polymerizing a polymerizable ethylenically unsaturated monomer component in the presence of a solution of hydrogen peroxide characterized in adding an aqueous hydrogen peroxide solution to the polymerizing monomer component incrementally throughout the course of the polymerization and simultaneously removing low boiling organic solvents and water from the polymerizing monomer component as the aqueous hydrogen peroxide solution is being added; the resulting free radical initiated addition polymer having a number average molecular weight of no greater than 8000.

2. The method of claim 1 in which the polymerization is conducted at ambient pressure.

3. The method of claim 1 in which the polymerizable ethylenically unsaturated monomer component is dissolved in an organic solvent.

4. The method of claim 1 in which the polymerizable ethylenically unsaturated monomer component contains a hydroxyl-containing monomer.

5. The method of claim 4 in which the hydroxyl-containing monomer comprises at least 10 percent by weight of the ethylenically unsaturated monomer component.

6. The method of claim 1 in which the polymerizable ethylenically unsaturated monomer component contains a carboxylic acid group-containing monomer.

7. The method of claim 1 in which the addition polymer has a number average molecular weight between 1000 and 4000.

8. The method of claim 1 in which the polymerization is conducted at a temperature of at least 140° C.

9. The method of claim 3 in which the organic solvent is selected from the class consisting of aromatic hydrocarbons, ketones and esters.

10. The method of claim 1 in which the water and low boiling organic solvents are removed by distillation.

11. The method of claim 1 in which the aqueous hydrogen peroxide is used in amounts of about 0.2 to 20 percent by weight, the percentage by weight being of hydrogen peroxide and being based on total weight of the polymerizable monomer component.

12. A method of preparing a free radical initiated addition polymer by polymerizing a polymerizable ethylenically unsaturated monomer component dissolved in an organic solvent, said polymerization being conducted in the presence of aqueous hydrogen peroxide, the improvement comprising adding the aqueous hydrogen peroxide to the polymerizing monomer component incrementally throughout the course of the polymerization and simultaneously removing water from the polymerizing monomer component as it is being added with the aqueous hydrogen peroxide, said resultant free radical initiated addition polymer having a number average molecular weight of no greater than 8000.

13. The method of claim 12 in which the polymerization is conducted at a temperature greater than 140° C.

14. The method of claim 12 in which the water is removed by distillation.

15. The method of claim 1 in which the aqueous hydrogen peroxide is used in amounts of about 0.2 to 20 percent by weight, the percentage by weight being of hydrogen peroxide and being based on total weight of the polymerizable monomer component.

16. The method of claim 12 in which the polymerization is conducted at ambient pressure.

* * * * *